United States Patent
Cho

(10) Patent No.: US 10,516,184 B2
(45) Date of Patent: Dec. 24, 2019

(54) DEVICE FOR MANUFACTURING BATTERY CELL CAPABLE OF REMOVING GAS TRAP BY VIBRATION

(71) Applicant: LG CHEM, LTD., Seoul (KR)

(72) Inventor: Sungju Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 37 days.

(21) Appl. No.: 15/577,940

(22) PCT Filed: May 19, 2016

(86) PCT No.: PCT/KR2016/005310
§ 371 (c)(1),
(2) Date: Nov. 29, 2017

(87) PCT Pub. No.: WO2017/030272
PCT Pub. Date: Feb. 23, 2017

(65) Prior Publication Data
US 2018/0175431 A1 Jun. 21, 2018

(30) Foreign Application Priority Data
Aug. 20, 2015 (KR) .................. 10-2015-0117283

(51) Int. Cl.
*H01M 10/04* (2006.01)
*H01M 10/0525* (2010.01)

(52) U.S. Cl.
CPC ........ *H01M 10/04* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2010/0152326 A1* | 6/2010 | Kurz | ...................... | C08J 3/2053 523/339 |
| 2013/0065111 A1* | 3/2013 | Kim | ........................ | H01M 2/38 429/163 |

(Continued)

FOREIGN PATENT DOCUMENTS

| | | |
|---|---|---|
| EP | 2115806 A1 | 11/2009 |
| EP | 2618404 A1 | 7/2013 |

(Continued)

OTHER PUBLICATIONS

International Search Report (PCT/ISA/210) issued in PCT/KR2016/005310, dated Aug. 25, 2016.

(Continued)

*Primary Examiner* — Wojciech Haske
(74) *Attorney, Agent, or Firm* — Mintz Levin Cohn Ferris Glovsky and Popeo, P.C.; Jhongwoo Peck

(57) ABSTRACT

The present invention provides a device for removing gas trap in a spare battery cell generated in a formation process during a process of manufacturing the battery cell, wherein the device is a gas trap removing device for manufacturing a battery cell, including: a battery cell receiving unit into which the spare battery cell is received; and a vibration applying unit for applying vibration to the battery cell receiving unit, in a state where the spare battery cell is received into the battery cell receiving unit.

8 Claims, 4 Drawing Sheets

(56) References Cited

U.S. PATENT DOCUMENTS

2013/0244093 A1* 9/2013 Min .................... H01M 2/0287
429/185
2015/0244032 A1* 8/2015 Yamamoto .......... H01M 10/446
29/623.1

FOREIGN PATENT DOCUMENTS

| JP | H05190168 A | 7/1993 |
| JP | H11265705 A | 9/1999 |
| JP | 2010-21104 A | 1/2010 |
| JP | 2014-502024 A | 1/2014 |
| JP | 2015-122392 A | 7/2015 |
| JP | 2015-138713 A | 7/2015 |
| KR | 2003-0062511 A | 7/2003 |
| KR | 10-2010-0101357 A | 9/2010 |
| KR | 10-2011-0124728 A | 11/2011 |
| KR | 10-2012-0060708 A | 6/2012 |
| KR | 10-2013-0128033 A | 11/2013 |
| KR | 10-2014-0018014 A | 2/2014 |
| KR | 10-2014-0132808 A | 11/2014 |
| KR | 101481860 B1 | 1/2015 |

OTHER PUBLICATIONS

Supplementary European Search Report corresponding to European Patent Application No. EP16837214.2, dated Mar. 22, 2019, 7 pages.

* cited by examiner

DEVICE FOR MANUFACTURING BATTERY CELL CAPABLE OF REMOVING GAS TRAP BY VIBRATION

TECHNICAL FIELD

The present invention relates to a gas trap removing device for manufacturing a battery cell using vibration. This application claims priority to and the benefit of Korean Patent Application No. 10-2015-0117283 filed in the Korean Intellectual Property Office on Aug. 20, 2015, the disclosure of which is herein incorporated by reference in its entirety.

BACKGROUND

Recently, the demand for environmentally-friendly alternative energy sources has become an indispensable factor for future life as the price of energy sources increases due to the depletion of fossil fuels and the concerns on environmental pollution are amplified. Therefore, a lot of research has been focused on various electric power production technologies such as atomic power, solar power, wind power, tidal power, etc., and electric power storage devices for more efficient use of the energy produced as such have been drawing much attention.

Particularly, as technology development and demand for mobile devices increase, the demand for batteries as an energy source is rapidly increasing, and recently, the use of rechargeable batteries as electric vehicles (EVs), hybrid electric vehicles (HEVs), etc., as power sources has been realized, and its application area is expanding to be used as an auxiliary power source, etc., through gridation, and accordingly, a lot of research on batteries that can meet various demands has been conducted.

Typically, there is a high demand for a prismatic secondary battery and a pouch-type secondary battery which can be applied to products such as mobile phones with a thin thickness, etc., with respect to the shape of the batteries, whereas there is a high demand for lithium secondary batteries such as lithium ion batteries and lithium ion polymer batteries, which have advantages such as high energy density, discharge voltage, output stability, etc., with respect to materials of the batteries. Additionally, the secondary battery is also classified according to the structure of the electrode assembly which includes an anode, a cathode, and a separator interposed between the anode and the cathode.

Representative examples may include a jelly-roll type (wound type) electrode assembly having a structure in which long sheet-like anodes and cathodes are wound in a state that separators are interposed therebetween; a stacking type electrode assembly in which a plurality of positive electrodes and negative electrodes cut in units of a predetermined size are sequentially stacked in a state that separators are interposed therebetween, etc. Recently, in order to solve the problems of the jelly-roll type electrode assembly and the stacked electrode assembly, a stacking/folding type electrode assembly, which is an electrode assembly having an advanced structure of a mixed type of the jelly-roll type and the stacking type, in which unit cells where positive electrodes and negative electrodes of a predetermined unit are stacked in a state that separators are interposed therebetween, are sequentially wound in a state being disposed on a separator film, is developed.

Additionally, the secondary battery, according to the shape of the battery case, is classified into a cylindrical battery, a prismatic battery in which an electrode assembly is built in a cylindrical or rectangular metal, and a pouch-type battery in which an electrode assembly is built in a pouch-type case of an aluminum laminated sheet.

Generally, a lithium secondary battery performs a formation process during a manufacturing process, and the formation process is a step of activating the battery by performing charging and discharging after assembling the battery, lithium ions discharged from the cathode at the time of charging move into the anode to be inserted thereto, and in particular, a solid electrolyte interface (SEI) film is formed on the surface of the anode. The formation process generally proceeds by repeating the charging and discharging with a constant current or constant voltage in a certain range.

As such, in the case of the cylindrical battery, the gas generated in the formation conversion process of the battery is concentrated in the winding center portion of the electrode assembly having a relatively small space due to the specificity of the shape of the electrode assembly, thereby forming gas trap, and the gas trap serves as a factor that prevents all portions of the electrode assembly from being completely impregnated in the electrolyte solution, and thus there is a problem in that a lithium precipitation region is generated at the center of the electrode assembly having the gas trap formed thereon.

FIG. 1 is a vertical cross-sectional view schematically showing the structure of a conventional cylindrical battery cell.

Referring to FIG. 1, the cylindrical battery cell 100 is manufactured by receiving a wound type electrode assembly 120 into a cylindrical case 130, injecting an electrolyte into the cylindrical case 130, and coupling a top cap 140 having an electrode terminal (e.g., a positive terminal; not shown) formed thereof into the open top end of the case 130.

The electrode assembly 120 has a structure in which an anode 121, a cathode 122, and a separator 123 are sequentially stacked and wound in a round shape, where a cylindrical center pin 150 is inserted into the wound core (the central portion of the jelly-roll) thereof. The center pin 150 is generally made of a metal material to provide a predetermined strength and is formed of a hollow cylindrical structure in which a plate material is bent in a round shape. The center pin 150 serves to fix and support the electrode assembly 120 and acts as a channel for releasing the gas generated by an internal reaction during charging and discharging and at the time of operation.

However, since the hollow portion of the center pin 150 is relatively narrow and fine, the gas generated during the formation process passes through the center portion of the electrode assembly 120 through the hollow portion of the center pin 150, is concentrated due to the reasons such as the bottleneck phenomenon, etc., thereby forming gas trap.

Generally, to solve the above problems, the gas trap is naturally removed for a sufficient time by charging the spare battery cell in a SOC range with the highest rate of gas trap formation (i.e., in a particular SOC range where the gas is produced in the highest amount) and undergoing an aging process under predetermined temperature and time.

However, since the aging process requires too much time, the process of manufacturing a battery cell may be delayed, and despite the aging process, it is possible that the gas trap inside may not be completely removed, thus reducing the reliability of the process.

Accordingly, there is a high need for the development of a technology that can fundamentally solve the problem.

Technical Problem

An object of the present invention is to solve the problems of the prior art and technical problems that have been required from the past.

The inventors of the present invention have performed in-depth research and various experiments, and as a result, have confirmed, as to be explained later, that it is possible to more easily remove the gas trap formed at the center of the electrode assembly in the formation process of the battery cell within a short period of time by constituting the gas trap-removing device for manufacturing a battery cell so as to apply vibration to the battery cell receiving unit in a state where the spare battery cell is received in the receiving unit of the battery cell, and accordingly, being capable of reducing time for manufacturing the battery cell and minimizing the possibility that the gas trap remains therein thus improving reliability of the process, and thereby completed the present invention.

Technical Solution

To achieve the above objects, the gas trap removing device for manufacturing a battery cell of the present invention is a device for removing gas trap in a spare battery cell generated in a formation process during a process of manufacturing the battery cell, which has a structure including:

a battery cell receiving unit into which the spare battery cell is received; and a vibration applying unit for applying vibration to the battery cell receiving unit, in a state where the spare battery cell is received into the receiving unit of the battery cell.

Accordingly, it is possible to more easily remove the gas trap formed at the center of an electrode assembly in the formation process of a battery cell within a short period of time by applying vibration to a battery cell receiving unit in a state where a spare battery cell is received in the battery cell receiving unit, and accordingly, being capable of reducing time for manufacturing the battery cell and minimizing the possibility that the gas trap remains therein, thereby improving reliability of the process.

In a specific embodiment, the battery cell may be a cylindrical battery cell in which an electrode assembly, which has a structure that a positive electrode, a negative electrode, and a separator interposed between the positive and negative electrodes are wound, is built in a battery case.

As explained above, the gas trap generated in the formation process of the spare battery cell may mostly occur in the cylindrical battery cell in which an electrode assembly, which has a structure that a positive electrode, a negative electrode, and a separator interposed between the positive and negative electrodes are wound, is built. Accordingly, the gas trap removing device for manufacturing a battery cell according to the present invention can exhibit an advantageous effect for removing gas traps within the cylindrical battery cell including the electrode assembly of the winding structure.

Meanwhile, the vibration may be applied by physical stimulation from a vibration applying unit that applies vibration to the battery cell receiving unit.

In a specific embodiment, the physical stimulation may performed by a physical impact being directly applied to the battery cell receiving unit from the vibration applying unit.

That is, the vibration applying unit may be in a structure in which a physical impact is applied by directly contacting the outer surface of the battery cell receiving unit in a state where the vibration applying unit is not in contact with the outer surface of the battery cell receiving unit in which the spare battery cell is received. Accordingly, vibration is applied to the spare battery cell received in the battery cell receiving unit, and thereby the gas trap located at the center of the electrode assembly can be removed.

In another specific embodiment, the physical stimulation may be in a structure in which the physical stimulation is performed by a repetitive flow of the vibration applying unit which is in contact with the battery cell receiving unit.

More specifically, the vibration applying unit may repeatedly flow in a state of being in contact with the outer surface of the battery cell receiving unit, and vibration is applied to the spare battery cell received in the battery cell receiving unit by the flow of the vibration applying unit, and thereby the gas trap located at the center of the electrode assembly can be removed.

In particular, the vibration applying unit can be finely and rapidly flowed in a repetitive manner within a short period of time, thereby maximizing the effect of removing the gas trap.

In still another specific embodiment, the physical stimulation may be performed by an ultrasonic wave.

Generally, ultrasonic wave can apply a regular vibration to the spare battery cell received in the battery cell receiving unit due to inherent high frequency. Accordingly, the gas trap in the spare battery cell can be more easily removed.

In particular, the ultrasonic wave may have a frequency of 20 kHz to 100 kHz and an amplitude of 2 μm to 30 μm.

If the frequency and the amplitude of the ultrasonic wave are lower than the above range, the effect of removing the desired gas trap cannot be exhibited. If the frequency and the amplitude of the ultrasonic wave are higher than the above range, efficiency in the manufacturing process is reduced, and durability of the battery cell may be deteriorated due to excessive vibration, and is thus not preferable.

Additionally, the physical stimulation from the vibration applying unit may be applied once, but the physical stimulation may be applied at least twice periodically or aperiodically to improve the efficiency.

In particular, it is obvious that the number and the period of the physical stimulation applied from the vibration applying unit can be appropriately selected according to conditions such as quantity and size of the spare battery cells received in the battery cell receiving unit.

Meanwhile, the battery cell receiving unit may be in a structure in which, in a state that one side is opened, the battery cell receiving unit is formed in a shape concavely recessed in the opposite direction from the open area.

Accordingly, the spare battery cell can be more easily received and removed through the open surface of the battery cell receiving unit, and it is possible to prevent damage of the spare battery cell due to vibration applied by the physical stimulation from the vibration applying unit and to more stably maintain the received state of the spare battery cell.

In a specific embodiment, the spare battery cell may be in a structure in which, the spare battery cell may be supported in a liquid medium in a state where the spare battery cell is received into a receiving unit of the battery cell.

More specifically, the liquid medium is a medium that transmits vibration due to a physical stimulation applied from the vibration applying unit to the spare battery cell, and the spare battery cell received in the battery cell receiving unit is supported so that the space between the battery cell receiving unit and the spare battery cell can be kept filled.

Accordingly, the vibration caused by the physical stimulation applied from the vibration applying unit can be more effectively transmitted to the spare battery cell while minimizing the loss, and by uniformly transmitting to all parts of the spare battery cell, It is possible to effectively prevent problems such as short-circuiting of the electrode assembly, etc., which may occur due to vibration concentrated at a specific region such as a region adjacent to the vibration applying unit with the battery cell receiving unit interposed therebetween.

Additionally, the spare battery cell may be in a structure in which the spare battery cell is supported in a liquid medium at least 50% based on the outer surface area to maximize the effect.

If the spare battery cell is supported in the liquid medium by less than 50% based on the outer surface area, the effect of the vibration transmission by the liquid medium is deteriorated and the desired effect may not be exhibited.

In this case, if the liquid medium can effectively transmit vibration due to physical stimulation from the vibration applying unit to the spare battery cell received in the battery cell receiving unit, the kind the medium is not limited to a great extent, but specifically the medium may be water considering cost, ease of treatment, etc.

Additionally, the spare battery cell may be received into the battery cell receiving unit after being charged in the range of 15 state of charge (SOC) to 20 SOC.

Generally, the gas generated in the formation process during the process of manufacturing a battery cell occurs maximally in the range of 16 SOC to 17 SOC, and accordingly, the gas is concentrated while passing through the central area of the winding-type electrode assembly, which has a narrow pathway for movement, due to the reasons such as the bottleneck phenomenon, etc., thereby forming gas trap.

Accordingly, the spare battery cell may be received into the battery cell receiving unit after being charged in the range of 15 SOC to 20 SOC where gas trap can be formed, according to the maximum generation of gas.

Meanwhile, the present invention provides a method for manufacturing a battery cell using a gas trap removing device for manufacturing a battery cell, in which the method for manufacturing a battery cell includes:

a) a step of charging the spare battery cell in the range of 15 SOC to 20 SOC;

b) a step of supporting the spare battery cell in a liquid medium in a state where the spare battery cell is received into the receiving unit of the gas trap removing device;

c) a step of removing gas trap in the spare battery cell by applying vibration to the battery cell receiving unit; and d) a step of completing a final battery cell by completing the charging and discharging of the spare battery cell;

In particular, as explained above, the vibration is applied by physical stimulation from the vibration applying unit, and specifically, the physical stimulation may be performed by a physical impact directly applied to the battery cell receiving unit from the vibration applying unit, a repetitive flow of the vibration applying unit in contact with the battery cell receiving unit, or ultrasonic wave.

Additionally, the vibration may be applied once, or at least twice periodically or aperiodically, to improve efficiency.

The present invention also provides a battery cell manufactured using the above method and a battery pack including at least one battery cell. Since specific constitutions of the battery cell and the battery pack are well-known in the art, a detailed description thereof will be omitted herein.

MODE FOR INVENTION

Hereinafter, the present invention is further described with reference to the drawings according to the embodiments of the present invention, but the scope of the present invention is not limited thereto.

Figure 1:
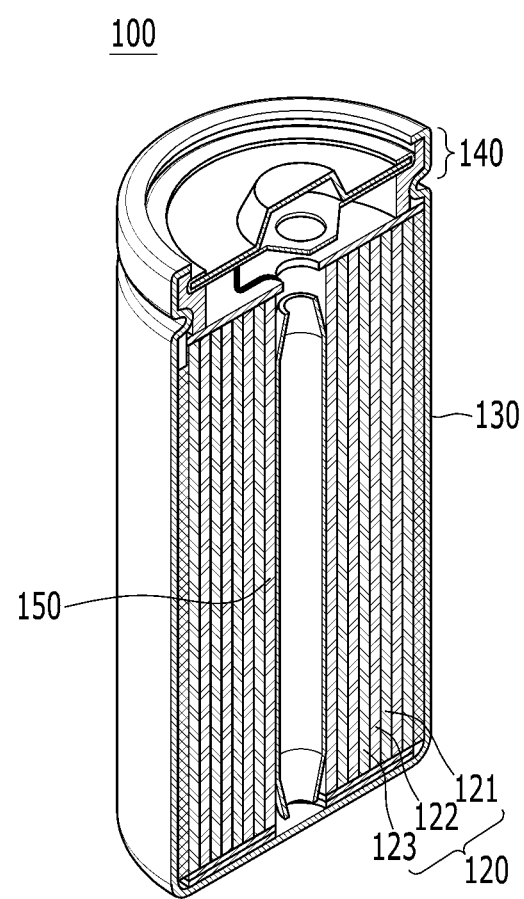
FIG. 1 is a vertical sectional view schematically showing the structure of a conventional cylindrical battery cell.
Figure 2:
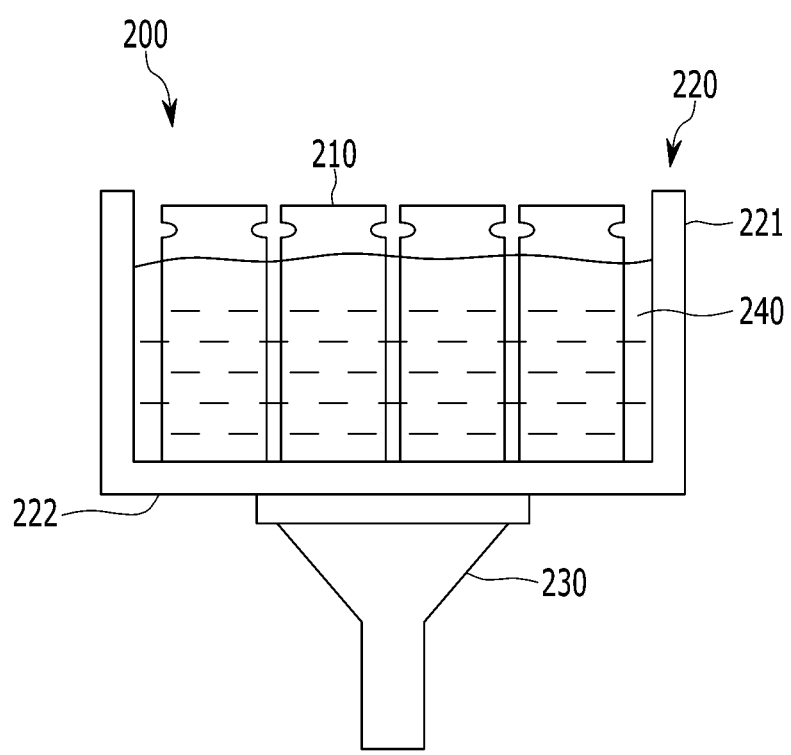
FIG. 2 is a schematic view schematically showing the structure of a gas trap removing device for manufacturing a battery cell according to an embodiment of the present invention.

Disclosed in FIG. 2 is a schematic view schematically showing the structure of a gas trap removing device for manufacturing a battery cell according to an embodiment of the present invention.

Referring to FIG. 2, the gas trap removing device 200 for manufacturing a battery cell includes a battery cell receiving unit 220 and a vibration applying unit 230.

The battery cell receiving unit 220 has an open top surface and is formed in a shape concavely recessed in the downward direction.

Accordingly, the spare battery cell 210 can be more easily stored and removed through the open top surface of the battery cell receiving unit 220, and the sidewall 221 of the battery cell receiving unit 220 formed according to the recessed shape can prevent the flow and damage of the spare battery cell 210 due to vibration applied from the vibration applying unit 230 by stably supporting the spare battery cell 210.

The spare battery cell 210 is stored in the battery cell receiving unit 220 in a state being charged in the range of 15 SOC to 20 SOC.

The spare battery cell 210 is supported in a liquid medium about 90% based on the outer surface area in a state where the spare battery cell 210 is received in the battery cell receiving unit 220.

Accordingly, the vibration from the vibration applying unit 230 can be more effectively transmitted to the spare battery cell 210 through the liquid medium 240 while minimizing the loss.

Additionally, the vibration from the vibration applying unit 230 can be uniformly transmitted to most parts of the spare battery cell 210 supported in the liquid medium 240, and thus, It is possible to effectively prevent problems such as short-circuiting of the electrode assembly, which may occur when vibrations are concentrated on a specific area, such as an area adjacent to the vibration applying unit 230, with the battery cell receiving unit 220 interposed therebetween.

The vibration applying unit 230 is formed of an ultrasonic wave horn having a circular cylindrical shape and is disposed being in contact with the lower surface 222 of the battery cell receiving unit 220.

The vibration applicator 230 applies an ultrasonic wave having a frequency of 20 kHz to 100 kHz and an amplitude of 2 μm to 30 μm. Accordingly, the ultrasonic wave vibrates the liquid medium 240, and this vibration is applied to the spare battery cell 210 received in the battery cell receiving unit 220, so that the gas trap at the center of the electrode assembly can be removed.

The physical stimulation performed by the ultrasonic wave of the vibration applying unit 230 may be applied once or at least twice periodically or aperiodically. Additionally, it is obvious that the vibration applying unit 230 may apply vibration through the ultrasonic wave in a state where the vibration applying unit 230 is in close contact with the battery cell receiving unit 220 in one or various directions of at least two, according to the number of the spare battery cells 210 received in the battery cell receiving unit 220, the size of the battery cell receiving unit 220, etc.

Figure 3:
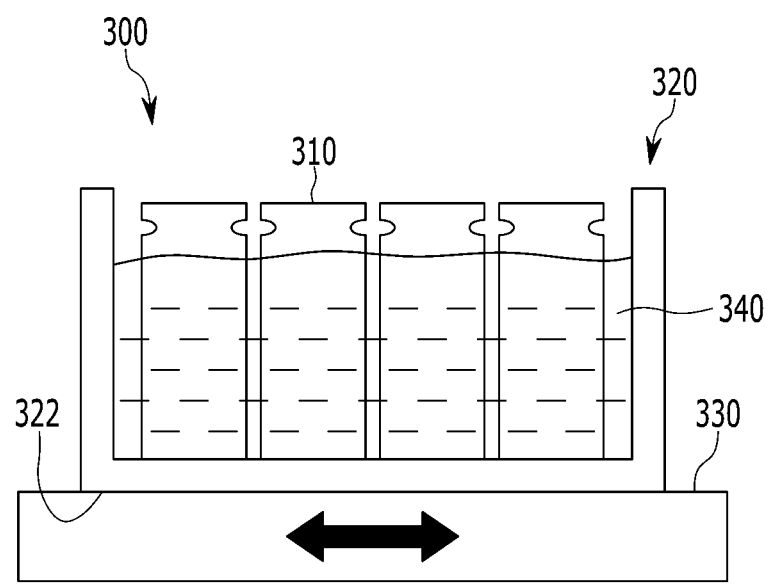
FIGS. 3 and 4 are schematic views schematically showing the structure of a gas trap removing device for manufacturing a battery cell according to another embodiment of the present invention.
Figure 4:
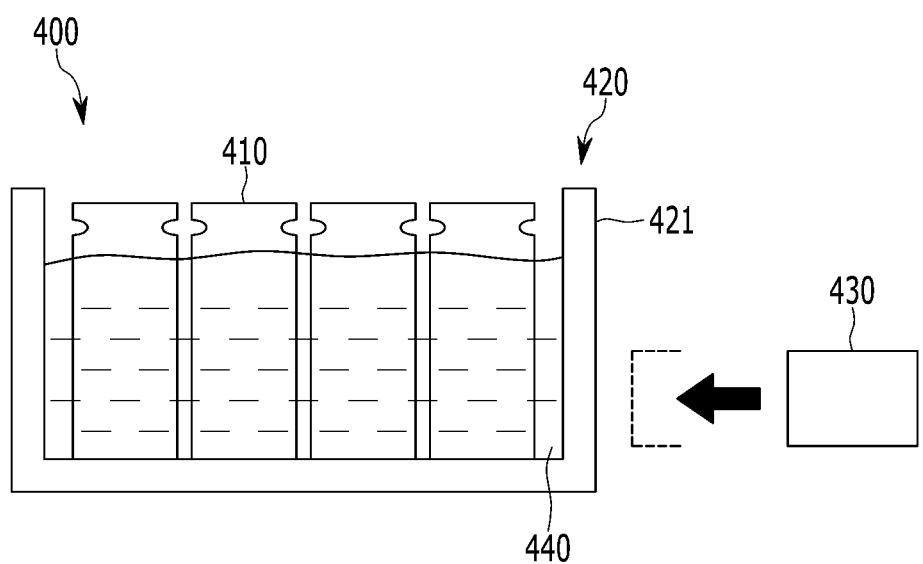

Disclosed in FIGS. 3 and 4 are schematic views schematically showing the structure of a gas trap removing device for manufacturing a battery cell according to another embodiment of the present invention.

First, referring to FIG. 3, the gas trap removing device 300 for manufacturing a battery cell has the same constitution as that of the gas trap removing device 300 shown in FIG. 2 (200 of FIG. 2) of the gas trap removing device for manufacturing a battery cell, with regard to the remaining constitution except for the vibration applying unit 330.

Specifically, the vibration applying unit 330 is a sheet-shaped structure, and is in contact with the lower surface 322 of the battery cell receiving unit 320.

The vibration applying unit 330 flows finely and rapidly in the left and right direction repeatedly within a short time. Accordingly, the vibration is applied to the spare battery cell 310 received in the battery cell receiving unit 320 through the liquid medium 340, so that the gas trap at the center of the electrode assembly can be removed.

The vibration of the vibration applying unit 330 may be applied once or at least twice periodically or aperiodically, and it is obvious that the vibration applying unit 330 may apply vibration through the ultrasonic wave in a state where the vibration applying unit 330 is in close contact with the battery cell receiving unit 320 in one or various directions of at least two, according to the number of the spare battery cells 310 received in the battery cell receiving unit 320, the size of the battery cell receiving unit 320, etc.

Referring to FIG. 4, the gas trap removing device 400 for manufacturing a battery cell has the same constitution as that of the gas trap removing device 400 shown in FIG. 2 (200 of FIG. 2) of the gas trap removing device for manufacturing a battery cell, with regard to the remaining constitution except for the vibration applying unit 430.

Specifically, the vibration applying unit 430 is located in the sidewall 421 direction of the battery cell receiving unit 420, and vibration is applied to the spare battery cell 410 received in the battery cell receiving unit 420 through the liquid medium 440 by directly applying a physical impact to the sidewall 421 of the battery cell receiving unit 420, and accordingly, the gas trap present at the center of the electrode assembly can be removed.

The physical impact may be applied once or at least twice periodically or aperiodically, and it is obvious that the vibration applying unit 430 may apply vibration through the ultrasonic wave in a state where the vibration applying unit 430 is in close contact with the battery cell receiving unit 420 in one or various directions of at least two, according to the number of the spare battery cells 410 received in the battery cell receiving unit 420, the size of the battery cell receiving unit 420, etc.

Those of ordinary skill in the art to which the present invention belongs will be able to make various applications and modifications within the scope of the present invention.

As described above, the gas trap removing device for manufacturing a battery cell according to the present invention, by being configured to apply vibration to the battery cell receiving unit in a state where the spare battery cell is received in the battery cell receiving unit, it is possible to more easily remove the gas trap formed at the center of the electrode assembly in the formation process of the battery cell within a short period of time, and as a result, the time required for manufacturing the battery cell can be saved, the process reliability can be improved by minimizing the possibility that the gas trap may remain, the loss of vibration transmitted to the spare battery cell can be minimized by being received into the battery cell receiving unit with the spare battery cell being supported in the liquid medium, and by uniformly transmitting to all parts of the spare battery cell, it is possible to effectively prevent problems such as short-circuiting of the electrode assembly, etc., which may occur due to vibration concentrated at a specific region such as a region adjacent to the vibration applying unit with the battery cell receiving unit interposed therebetween.

The invention claimed is:

1. A device for removing gas trap in a spare battery cell generated in a formation process during a process of manufacturing the battery cell,
    wherein the device is a device for manufacturing a battery cell capable of removing gas trap during the formation process, comprising:
    a battery cell receiving unit into which the spare battery cell is received; and
    a vibration applying unit for applying vibration to the battery cell receiving unit, in a state where the spare battery cell is received into the battery cell receiving unit,
    wherein the battery cell is a cylindrical battery cell in which an electrode assembly is built in a battery case,
    wherein the electrode assembly has a structure in which a positive electrode, a negative electrode, and a separator interposed between the positive and negative electrodes are wound around a center pin, and
    wherein the center in is vertically oriented when the vibration is applied to the battery cell by the vibration applying unit to cause the gas trap to be released through the center pin.

2. The device of claim 1, wherein the vibration is applied by physical stimulation from the vibration applying unit.

3. The device of claim 2, wherein the physical stimulation is performed by a physical impact being directly applied to the battery cell receiving unit from the vibration applying unit,
    or the physical stimulation is performed by a repetitive flow of the vibration applying unit which is in contact with the battery cell receiving unit.

4. The device of claim 2, wherein the physical stimulation is performed by an ultrasonic wave, and the ultrasonic wave has a frequency of 20 kHz to 100 kHz and an amplitude of 2 μm to 30 μm.

5. The device of claim 1, wherein the battery cell receiving unit, in a state that one surface is opened, is formed in a recessed shape in the opposite direction from the open area.

6. The device of claim 1, wherein the spare battery cell is supported in a liquid medium, in a state where the spare battery cell is received into a receiving unit of the battery cell.

7. The device of claim 6, wherein the spare battery cell is supported in a liquid medium of water at least 50% based on the outer surface area.

8. The device of claim 1, wherein the spare battery cell is received into the battery cell receiving unit after being charged in the range of 15 state of charge (SOC) to 20 SOC.

* * * * *